April 29, 1952     H. FREEDMAN ET AL     2,594,903

DISPLAY DEVICE

Filed June 28, 1950     2 SHEETS—SHEET 1

*INVENTOR.*
HARRY FREEDMAN &
SOL FREEDMAN
BY

ATTORNEYS.

INVENTOR.
HARRY FREEDMAN &
SOL FREEDMAN
BY
ATTORNEYS

Patented Apr. 29, 1952

2,594,903

UNITED STATES PATENT OFFICE 2,594,903

DISPLAY DEVICE

Harry Freedman and Sol Freedman,
Philadelphia, Pa.

Application June 28, 1950, Serial No. 170,902

5 Claims. (Cl. 40—135)

This invention relates to a display device and more particularly relates to such a device using an artificial source of illumination. In its preferred form the invention provides a colored display.

Conventional display devices generally carry a picture or device which is in a single plane and which is illuminated by a source of light which lies in front of the picture or design. Such displays having no depth give an unreal and lifeless impression on the observer.

More appealing and realistic displays overcoming this defect have been achieved by making the display utilizing actual life-size or scale models. Such displays, however, have numerous disadvantages, such as, for example, high cost of production and high upkeep costs.

It is, therefore, an object of this invention to provide a display device which can be made at low cost and yet has a very superior appearance.

It is a further object of this invention to provide a display device which has a life-like appearance.

It is an additional object of this invention to provide a display device which conveys a strong impression of depth and dimension.

It is an additional object of this invention to provide a display device which has superior and novel coloring.

These and other objects of this invention will be apparent from a reading of the description in conjunction with the following drawings in which.

Figure 1:
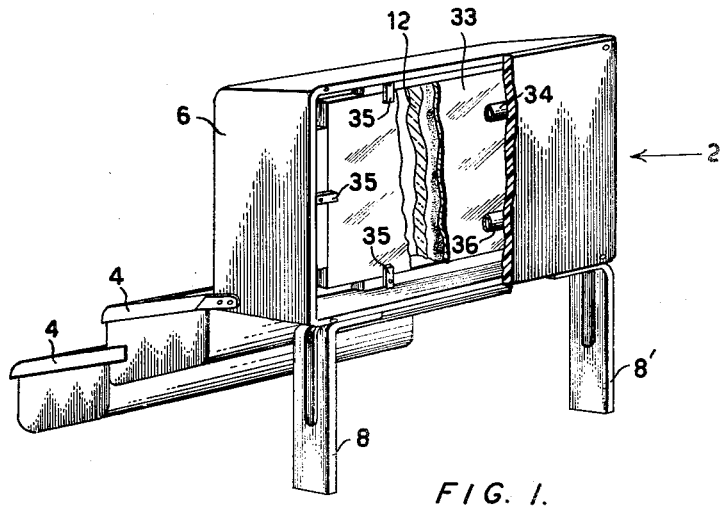
Figure 1 is a rear perspective view of a display device, in accordance with this invention, partly broken away.
Figure 2:
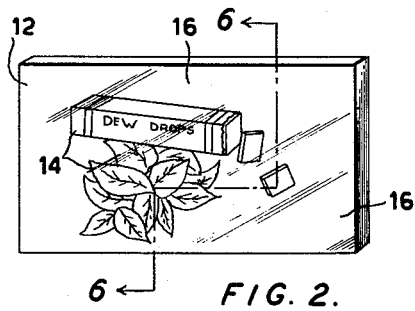
Figure 2 is a front perspective view of the diaphanous sheet shown in the device of Figure 1.

In general, the device in accordance with this invention comprises a photosensitive diaphanous sheet which carries a design in considerable depth. Preferably, the design will be in color.

Any of the well-known photosensitive diaphanous sheets carrying a design in depth therein can be utilized. By way of specific example, the glass disclosed in Patent No. 2,326,012, issued August 3, 1943, to Robert H. Dalton and disclosed in Patent No. 2,422,472, issued June 17, 1947, to Robert H. Dalton is satisfactory. The use of this glass provides a colored design which is imbedded deep in the glass and, therefore, gives a true effect of depth. Opacifiable photosensitive glass as well as silver containing photosensitive glass are further examples.

Mounted behind the photosensitive diaphanous sheet is a backing sheet. This is an translucent sheet carrying a translucent colored design which is adapted to register with the design on the diaphanous sheet. This translucent sheet may be of any common translucent material, such as, for example, a synthetic resin such as a vinyl resin. Alternatively, the backing sheet can be a transparent sheet having, for example, a translucent pigmented coating.

In the preferred form, the translucent sheet is formed or embossed so as to provide a shadow effect and to position portions of the translucent sheet at varying distances from the photosensitive sheet. This forming can be accomplished in any well known manner such as by a forming die.

The coloring material used to place the design on the backing sheet will vary widely, depending upon the method of printing utilized, it being apparent that any of the well-known printing methods, such as, for example, a letter press, photo-offset or rotogravure may be used.

Since, as will become apparent, the artificial light source is preferably behind the backing sheet, a basic requirement of the inks used is that they be diaphanous. This characteristic is readily obtained by the use of well-known printing inks containing either pigments or dyes, the only requirement being that there be a sufficient dispersion of the particles in the ink to insure that sufficient light can pass through. Since artificial illumination is relied on principally, dyes and/or pigments responsive to artificial illumination will be used, but daylight dyes and pigments may also be used in addition to get the benefit of any natural light available. Of course, the ink will be selected so as to be compatible with the translucent base sheet. Thus, for example, if a vinyl base sheet is used, a vinyl based ink can be used. The formulation of these inks will present no problem to one skilled in the art.

In its preferred form, the backing sheet carries a design printed thereon with inks containing light emitting particles such as fluorescent, phosphorescent or radium activated particles. Here again the dispersion of the light emitting particles must be such as will provide for the access of energizing light and the direction of sufficient light from the light emitting particles to the diaphanous photosensitive sheet. Exemplary of satisfactory light emitting particles are cadmium sulfide and zinc sulfide.

The following are exemplary of inks which have been found to be satisfactory:

EXAMPLE 1

*Ink for use with photo-offset method*

Base:                                          Parts by weight
1. No. 1 lithographic varnish_____ 16
2. No. 3 lithographic varnish_____ 2
3. Aluminum hydrate dry_____ 12
4. Offset ink wax compound_____ 1
5. Manganese drier_____ 2

Colorant:
1. Red fluorescent pigment—zinc sulfide-cadmium sulfide base_____ 11
2. Orange fluorescent pigment—zinc sulfide-cadmium sulfide base_____ 6
3. Cadmium yellow pigment_____ 3
4. Lithol toner (red)_____ 1

EXAMPLE 2

*Ink for use with letter press method*

Base:                                          Parts by weight
1. No. 0 lithographic varnish_____ 3
2. Rosin oil_____ 3
3. Manganese dryer_____ 1
4. Aluminum hydrate dry_____ 2

Colorant:
1. Red fluorescent pigment—zinc sulfide-cadmium sulfide base_____ 11
2. Orange fluorescent pigment—zinc sulfide-cadmium sulfide base_____ 6
3. Cadmium yellow pigment_____ 3
4. Lithol toner (red)_____ 1

The above inks are given merely by way of example, since any of the well known inks containing light emitting particles can be used. Similar inks which do not contain any light emitting particles are also within the scope of this invention.

It will be apparent that the light emitting particles can be incorporated in the sheet when it is manufactured by well-known processes.

As has been heretofore stated, the artificial light source is preferably located behind the translucent sheet and can be any of the well-known types of light used for conventional illumination or can be black light or a combination of the two, depending on the light emitting particles used, if any. By ordinary illumination light is meant light having wave lengths within the range of approximately 4,000 to 7,500 angstrom units. By black light is meant the light supplied by the conventional black light bulb which supplies light having wave lengths of from 3,200 to 4,600 angstrom units. Light which is capable of exciting fluorescent material has a wave length in the range of 3,200 to 3,800 angstrom units.

It is preferred to use a printing ink containing fluorescent material such as cadmium or zinc sulfide which, when exposed to black light will emit visible light. This black light is the preferred illumination.

The light source may be in front of, behind or on one edge of the display. Preferably, it will be located behind the backing sheet.

Referring now to the drawings, Figure 1 shows a display device 2 in accordance with this invention. The display device 2 has a plurality of stepped bins 4 for the reception of merchandise. A casing 6 is supported by the bins and a pair of legs 8—8.

Figure 5:
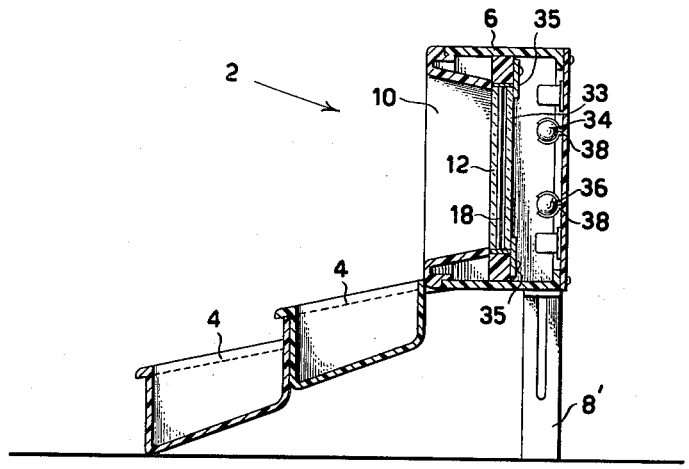
Figure 5 is a vertical sectional view of the device of Figure 1.
Figures 6, 7, 8:
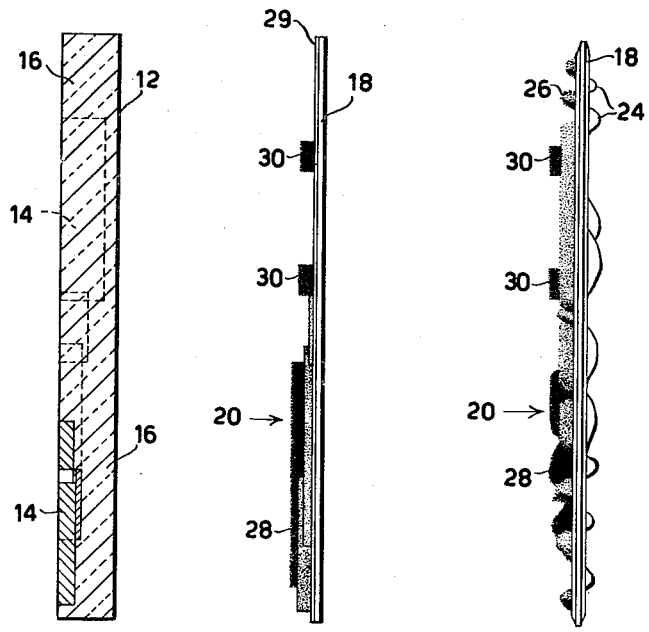
Figure 6 is a view taken on the line 6—6 of Figure 2.
Figure 7 is a view taken on the plane indicated by the line 7—7 in Figure 3.
Figure 8 is a view taken on the plane indicated by the line 8—8 in Figure 4.

As shown clearly in Figures 1 and 5, casing 6 has an opening in its front at 10 in which is supported a photosensitive diaphanous glass sheet 12 carrying a design 14 developed therein. As is illustrated by Figure 6, this design is developed deep into the body of the glass. Preferably, the design 14 and the remainder of sheet 12 will be at least partially colored. Sheet 12 may have wholly undeveloped portions as, for example, the portions indicated at 16.

Directly behind sheet 12 is a translucent backing sheet 18. The sheet 18 carries a design 20 which is adapted to register with the design 14 of sheet 12. The design 20 is printed on sheet 18 by ink containing a fluorescent material which, when subjected to black light, will emit light which, of course, appears to be colored, depending on the color of the pigment employed in the ink. The design 20 as thus printed comprises the leaves 28, package bends 30 and the words "Dew Drop" indicated at 32.

It will be noted that sheet 18 is formed so as to have an uneven surface which is at varying distances from the sheet 12. The forming of sheet 18 gives an additional effect of depth to the display as will become more apparent later. In addition, it will become apparent that the forming of sheet 18 causes a shadow effect which gives the display a pleasing effect and dimension.

The forming is carried out so as to register with the design of sheet 12. Thus, for example, the package 22 is raised, i. e., close to sheet 12, while the background above the package at 24 is depressed, i. e., more remote from the sheet 12. Again, the portion of sheet 18 indicated at 26 is raised to be closer to sheet 12 than its surrounding portions.

In order to heighten the effect of depth, the portions of the design which it is desired to make appear close to the observer are made more intense than the portions which should appear more remote. This can readily be done by placing more coats of ink on the portions to be more intense or using a plurality of inks of varying shades.

Figure 3:
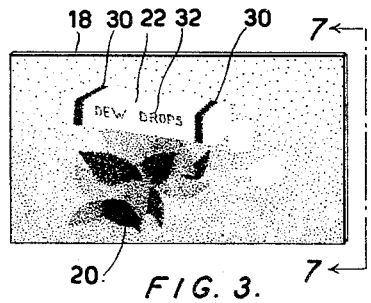
Figure 3 is a front perspective view of a translucent backing sheet before it is formed.
Figure 4:
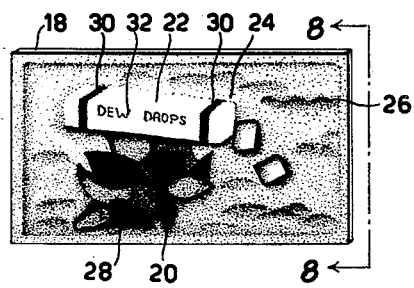
Figure 4 is a front perspective view of the backing sheet of Figure 3 after it is formed.

Observing Figure 7, it will be seen that the backing sheet 18 has a coat 29 containing zinc sulfide and cadmium sulfide. This coat may be, for example, a resin compatible with the backing sheet. Thus, if the backing sheet is a vinyl resin, the coat may be, for example, polyvinyl chloride. This coat is partially overcoated with a light shade of yellow ink containing fluorescent material indicated by light stippling and a dark shade of yellow ink containing fluorescent material indicated by heavy stippling. It will be noted that the various layers of ink overlap, and where this occurs, a more intense color shade is created.

Where a lesser effect of depth is desired, the backing sheet 18 can be left unformed, i. e., lying all in the same plane, as is illustrated in Figure 3.

Sheets 12 and 18 are held in position between frame 31 and transparent glass pane 33, the glass pane being retained by clips 35.

Behind sheet 18, lights 34 and 36 are mounted by means of brackets 38. These lights transmit black light which is capable of exciting the fluorescent material utilized on sheet 18. The position of these lights, together with the manner in which the sheet 18 is formed will be determined by the shadow effect it is desired to produce on sheet 18.

In operation, it will be apparent that the black light will pass from the lights 34 and 36 to and through translucent sheet 18 where the 3,200 to 3,800 angstrom unit wave lengths of light will excite or activate the fluorescent material used in coating sheet 18 and in the ink forming the design thereon. The fluorescent particles thus excited will, in turn, transmit light from sheet 18 through sheet 12, the nature of the light being modified by the pigments where used.

Thus, for example, the bands 30, if printed with an ink containing a yellow pigment and fluorescent material, will, under the influence of the black light, appear to be yellow and thus will effectively color yellow the undeveloped band portion 16 of sheet 12. The same may be said for the letters shown at 32. The remaining portions of package 22 being coated with fluorescent material will light up the developed registering portions on sheet 12.

As pointed out above, the conventional black light bulb contains light having wave lengths of from 3,800 to 4,600 angstrom units. This light passes through backing sheet 18 and aids in lighting up sheet 12, the light being modified by any daylight pigments on sheet 18.

It will at once be apparent that, due to the package 22 being raised and closer to sheet 12 and portion 24 immediately above the package, a high degree of perspective feeling is supplied to the composite display. This is heightened by the varying color shades. A further feeling of depth and an attractive appearance is created by the shadowing incident to the placement of the lights and the forming of sheet 18. Thus, considering the raised portion 26, it will be apparent that the central and upper sections of portion 26 will receive very little light from light 34 due to the fact that the rays from light 34 cannot reach it directly and will receive a comparatively small amount of light from light 36 due to the fact that it is comparatively remote.

Applicants do not desire to be limited except as set forth in the appended claims.

What is claimed is:

1. A display device comprising a photosensitive diaphanous sheet carrying a design in depth, a translucent backing sheet adjacent the rear face of said diaphanous sheet and having a translucent colored design in register with and partly coextensive with said first mentioned design, said translucent backing sheet being formed so that its surface is at varying distances from said diaphanous sheet and a source of light positioned behind said translucent backing sheet.

2. A display device comprising a photosensitive glass sheet carrying a design in color and in depth, a translucent backing sheet adjacent the rear face of said diaphanous sheet and having a translucent colored design in register with and partly coextensive with said first mentioned design, said translucent backing sheet being formed so that its surface is at varying distances from said diaphanous sheet and a source of light positioned behind said translucent backing sheet.

3. A display device comprising a photosensitive glass sheet carrying a design in color and in depth, a translucent backing sheet adjacent the rear face of said diaphanous sheet and having a translucent colored design in register with and partly coextensive with said first mentioned design and said colored design being in varying shades, said translucent backing sheet being formed so that its surface is at varying distances from said diaphanous sheet and a source of light positioned behind said translucent backing sheet.

4. A display device comprising a photosensitive glass sheet carrying a design in color and in depth, a translucent backing sheet adjacent the rear face of said diaphanous sheet and having a translucent colored design containing light emitting particles, being in register with and partly coextensive with said first mentioned design, said translucent backing sheet being formed so that its surface is at varying distances from said diaphanous sheet and a source of light positioned behind said translucent backing sheet to energize the light emitting particles.

5. A display device comprising a photosensitive glass sheet carrying a design in color and in depth, a translucent backing sheet adjacent the rear face of said glass sheet, having a translucent design containing light emitting particles, and being in register with and partly coextensive with said first mentioned design, said translucent backing sheet being formed so that the surface is at varying distances from said diaphanous sheet and a source of light positioned behind said translucent backing sheet to energize the light emitting particles.

HARRY FREEDMAN.
SOL FREEDMAN.

REFERENCES CITED

The following references are of record in the file of this patent:

UNITED STATES PATENTS

| Number | Name | Date |
|---|---|---|
| 2,105,008 | Riley | Jan. 11, 1938 |
| 2,151,055 | Stark | Mar. 21, 1939 |
| 2,347,285 | Russell | Apr. 25, 1944 |
| 2,372,124 | Schenkel | Mar. 20, 1945 |
| 2,422,472 | Dalton | June 17, 1947 |